(12) United States Patent
Kuffner

(10) Patent No.: US 9,060,108 B1
(45) Date of Patent: Jun. 16, 2015

(54) APPARATUS AND METHODS FOR REDIRECTING LIGHT TO PROVIDE FOR REORIENTATION OF A CAMERA

(71) Applicant: Google Inc., Mountain View, CA (US)

(72) Inventor: James Kuffner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 183 days.

(21) Appl. No.: 13/745,851

(22) Filed: Jan. 20, 2013

Related U.S. Application Data

(60) Provisional application No. 61/596,841, filed on Feb. 9, 2012.

(51) Int. Cl.
*H04N 5/225* (2006.01)
*G02B 7/182* (2006.01)

(52) U.S. Cl.
CPC ............ *H04N 5/2251* (2013.01); *G02B 7/1827* (2013.01)

(58) Field of Classification Search
CPC ............ H04N 5/2251–5/2254; H04N 2101/00
USPC .................................................. 348/373–376
See application file for complete search history.

(56) References Cited

U.S. PATENT DOCUMENTS

| | | | |
|---|---|---|---|
| 4,911,530 A * | 3/1990 | Lo ................................. | 359/464 |
| 2007/0206940 A1* | 9/2007 | Kusaka ......................... | 396/128 |
| 2008/0159730 A1* | 7/2008 | Yagyu et al. .................. | 396/354 |
| 2008/0205873 A1 | 8/2008 | Park | |
| 2009/0002797 A1 | 1/2009 | Kwong et al. | |
| 2010/0328420 A1* | 12/2010 | Roman ....................... | 348/14.08 |
| 2011/0081946 A1 | 4/2011 | Singh | |

OTHER PUBLICATIONS

ISnapMe.com, visited Jan. 20, 2013.

* cited by examiner

*Primary Examiner* — Roberto Velez
*Assistant Examiner* — Tuan Le
(74) *Attorney, Agent, or Firm* — McDonnell Boehnen Hulbert & Berghoff LLP

(57) ABSTRACT

Apparatuses and methods for enabling a device to capture additional views with a camera are provided. An apparatus including reflective surfaces may be mounted to a device with a camera. The reflective surfaces may be positioned around the camera lens in such a way so as to redirect light into the lens, giving the effect of the camera being rotated, tilted, or otherwise moved to face a particular direction. A motor may be provided in the apparatus to move the reflective surfaces to a user's preference.

15 Claims, 8 Drawing Sheets

APPARATUS AND METHODS FOR REDIRECTING LIGHT TO PROVIDE FOR REORIENTATION OF A CAMERA

BACKGROUND

A typical mobile device, such as a mobile phone or a portable electronic device, may integrate many personal data assistant ("PDA") features as well as multimedia functions, including an integrated camera or image capture device for capturing still pictures and/or videos. The integrated camera includes a camera lens that is typically positioned on an exterior surface of one side of the mobile device. As users continue to utilize the image-capturing capabilities provided on their mobile devices, the users may seek a more flexible camera lens position for image-capturing applications.

Some mobile devices have integrated cameras with a second lens on another side of the mobile device, allowing a user to take pictures from either side of the device. The cost of integrating a second camera lens for a manufacturer may be significant, and the second camera lens is typically a lower-quality lens. Moreover, a mobile device with a two-camera lens still only provides limited angles for image capturing.

SUMMARY

This disclosure may disclose, inter alia, apparatuses and methods for redirecting light to provide for the reorientation of cameras.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon to perform functions of the methods described herein.

The computer readable medium may include a non-transitory computer readable medium, for example, such as computer-readable media that store data for short periods of time like register memory, processor cache, and Random Access Memory (RAM). The computer readable medium may also include non-transitory media, such as secondary or persistent long term storage, like read only memory (ROM), optical or magnetic disks, or compact-disc read only memory (CD-ROM), for example. The computer readable medium may also be any other volatile or non-volatile storage system. The computer readable medium may be considered a computer readable storage medium, for example, or a tangible storage medium.

In addition, circuitry may be provided that is wired to perform logical functions in any processes or methods described herein.

In still further examples, any type of devices may be used or configured to perform logical functions in any processes or methods described herein.

In yet further examples, any type of device may be used or configured as a means for performing functions of any of the methods described herein (or any portions of the methods described herein).

In one aspect, an exemplary apparatus includes a first reflective surface, a second reflective surface, a non-reflective surface positioned between the first reflective surface and the second reflective surface, an attachment mechanism coupled to the second reflective surface comprising a band with a first arm and a second arm configured to attach the apparatus to a device, wherein each of the first arm and the second arm is configured to wrap around the sides of the device, a motor, and an input mechanism. The input mechanism communicates to the motor to move at least one of the first reflective surface, the second reflective surface, and the non-reflective surface.

In another aspect, an exemplary method includes a first reflective surface directing a ray of light in a first direction and a second reflective surface directing a ray of light in a second direction, wherein the second direction sends the ray of light into a camera lens. The method further includes minimizing distortions during the directing of the ray of light in the first direction by positioning a non-reflective surface between the first and the second reflective surfaces. The method also includes receiving an input to change the position of at least one of the first reflective surface and the second reflective surface, and responsively moving the first reflective surface, the second reflective surface, or both the first reflective surface and the second reflective surface.

In yet another aspect, an exemplary apparatus includes a first reflective surface, a second reflective surface, and a splitter. A first non-reflective surface is positioned between the first reflective surface and the splitter, and a second non-reflective surface is positioned between the second reflective surface and the splitter. A motor and an input mechanism are also included in the apparatus. The input mechanism controls the motor to move at least one of the first reflective surface, the second reflective surface, the first non-reflective surface, the second non-reflective surface, and the splitter.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

In the Figures.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, apparatuses and methods for redirecting light to provide for the reorientation of cameras.

Overview

Attachments may be provided for a device that includes a camera to enable the device to capture additional views with the camera.

An exemplary embodiment may provide for an apparatus that is attachable to a device with a camera. The apparatus may include a reflective surface or a plurality of reflective surfaces, as well as non-reflective surfaces, that are positioned around the camera lens in such a way so as to direct light into the lens. The reflective surfaces may then enable the camera lens to receive light reflected from a number of directions, so as to give the effect of the camera being rotated, tilted, or moved to face a particular direction. A motor may be provided in the apparatus to move the reflective and/or non-reflective surfaces, and an input mechanism may also be included on the apparatus to control the motor, allowing a user steer the reflective and/or non-reflective surfaces to the user's preference. Further, reflective surfaces may be used to redirect a flash of a camera to provide light in a number of directions as well.

It should be understood that the above application of an exemplary embodiment is provided for illustrative purposes, and is just one of many possible applications of an exemplary embodiment.

1. OVERVIEW OF APPARATUSES FOR REORIENTING CAMERAS

Figure 1A:
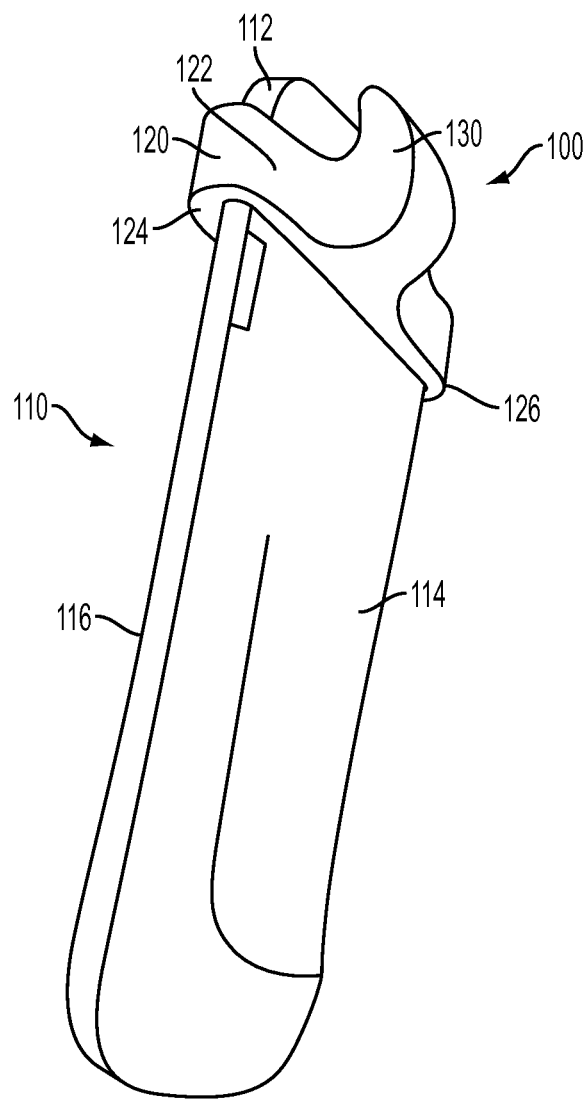
FIG. 1A is an example apparatus attached to an example mobile device.

FIG. 1A is an example apparatus 100 attached to an example mobile device 110. The mobile device 110 may be a mobile or cellular phone or a portable electronic device such as a laptop computer or tablet, or any other mobile computing device, for example. In the example illustrated in FIG. 1A, the mobile device 110 is a mobile phone. The mobile device 110 includes a top surface 112, a back surface 114, and a front surface 116.

In some examples, the mobile device 110 may contain computer hardware, such as a processor and memory or storage, and may also include a wired or wireless network interface through which the mobile device 110 can connect to a server. As an example, the mobile device 110 may be configured use one or more protocols such as 802.11, 802.16 (WiMAX), LTE, GSM, GPRS, CDMA, EV-DO, and/or HSPDA, among others. Furthermore, the mobile device 110 may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

Figure 1B:
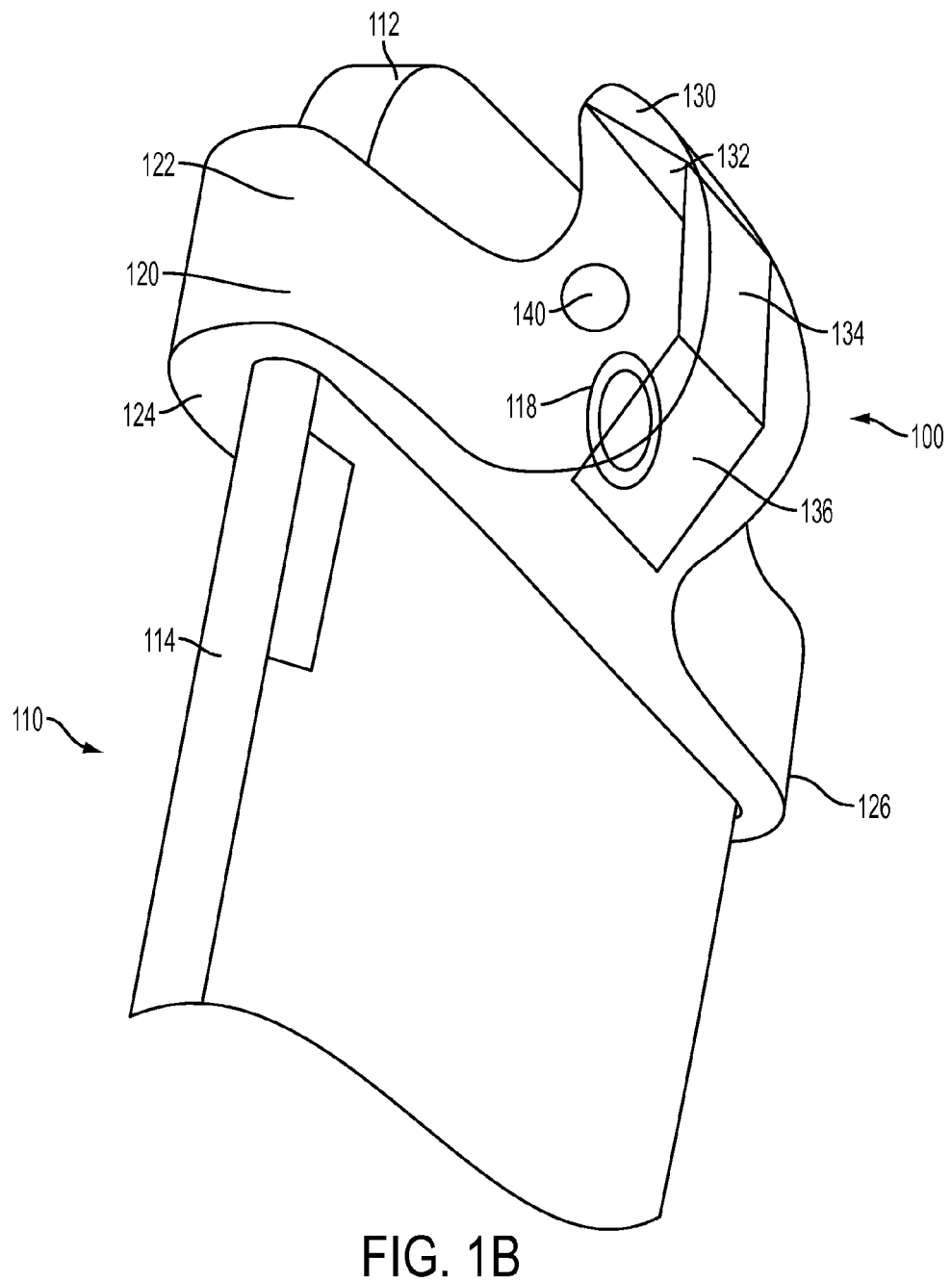
FIG. 1B is an enlarged view of the mobile device and the apparatus of FIG. 1A.

FIG. 1B is an enlarged view of the mobile device 110 and the apparatus 100 of FIG. 1A. As shown in FIG. 1B, the mobile device 110 also includes a camera with a camera lens 118 on the back surface 114 of the mobile device 110. Typically, light rays shine through the camera lens 118 and refract into a camera chip sensor, which digitizes the rays of light to form a digital image, namely a still image or a frame of video. Digitizing a digital image may also be referred to as capturing an image.

In some examples, the apparatus 100 is provided to capture additional views with the camera. The apparatus 100 may include an attachment mechanism 120, a light redirection portion 130, and a motor 140.

In some examples, the attachment mechanism 120 includes a band 122 with a first bent arm 124 and a second bent arm 126. As shown in FIGS. 1A and 1B, each of the bent arms 124, 126 wraps around a side of the mobile device 110 in a friction fit to hold the attachment mechanism 120 in place on the mobile device 110.

As shown in FIG. 1B, the light redirection portion 130 includes a first reflective surface 132, a non-reflective surface 134, and a second reflective surface 136. In the example shown in FIG. 1B, the second reflective surface 136 is positioned opposite from and at an angle to the camera lens 118. At least a portion of the first reflective surface 132 extends above the top surface 112 of the mobile device 110. The non-reflective surface 134 faces the back surface 114 of the mobile device 110 and is positioned between the first reflective surface 132 and the second reflective surface 136. The non-reflective surface 134 may serve to minimize any undesirable image distortions during image reflection and redirection between the first reflective surface 132 and the second reflective surface 136.

The light redirection portion 130 may be integral with the attachment mechanism 120. Thus, the attachment mechanism 120 may serve to stabilize and maintain the light redirection portion 130 in a fixed position on the mobile device 110.

Each of the reflective surfaces 132, 134, may be any surface that allows for the specular reflection of light. In one example, the reflective surfaces 132, 134 may include mirrors.

The motor 140 may be any electric motor known in the art. The motor 140 may be connected to one or more of the reflective surfaces 132, 136, and/or the non-reflective surface 134. For example, the motor 140 may be attached to either a gear set or to push/pull cables that are attached to the reflective surfaces 132, 136, and/or the non-reflective surface 134. Other examples may be envisioned as well.

In some examples, an input mechanism may be positioned on the attachment mechanism 120 to allow for a user to control the motor. Thus, the motor 140 may be activated by a user to tilt or otherwise move either or both of the first reflective surface 132 and the second reflective surface 136 to desired positions for image reflection and redirection into the camera lens 118. The input mechanism may be a toggle or rocker switch that may allow for the operation of the motor without software. In another example, the input mechanism may be a knob or a button, or a plurality of knobs or buttons, the manipulation of which sends information to a processor to operate the motor 140.

In some embodiments, the light redirection portion 130 may further be used to redirect a flash of a camera to provide light in any direction.

In some embodiments, polarization filters may also be provided. The polarization filters may filter out a polarized component of light at the time of exposure, and may absorb some light waves. In one embodiment, the polarization filter may be a linear filter. In another embodiment, the polarization filter may be a circular filter.

Figure 2:
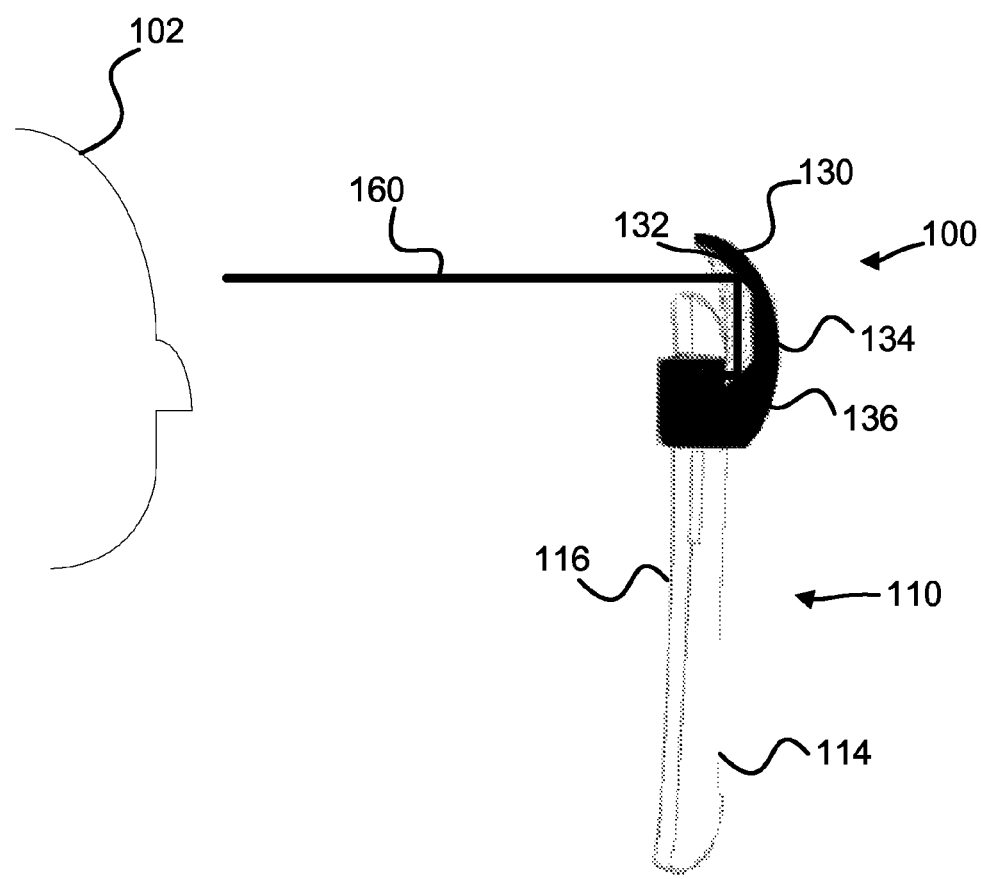
FIG. 2 is side view of the mobile device and the apparatus of FIG. 1A for changing an image-capturing orientation of the camera on the mobile device.

FIG. 2 is a side view of the mobile device 110 and the apparatus 100 for changing an image-capturing orientation of the camera on the mobile device 110. In the example shown in FIG. 2, a user 102 positions the mobile device 110 such that the front surface 116 of the mobile device 110 faces the user 102. The user 102 then tries to take a picture of him or herself. An exemplary light ray, depicted by line 160, hits the first reflective surface 132, and is redirected (due to the angled position of the surface) down at a 90 degree angle. The light ray continues on the path depicted by line 160, moving parallel to the non-reflective surface 134, until the light ray hits the second reflective surface 136. The light ray is once again redirected, due to the angled position of the surface, and moves into the camera lens. In this example, the angle of the second reflective surface 136 is such that the ray is redirected 90 degrees from its former path.

Thus, although the camera lens 118 is on the back surface 114 of the mobile device 110, the light redirection portion 130 of the apparatus 100 allows the user 102 to capture an image of the user's face when the user 102 is facing the front surface 116 of the mobile device 110. Thus, the user 102 can simultaneously capture an image of him or herself while viewing on a screen on the front surface 116 the image that is about to be captured. The user 102 may change the tilt of either or both of first reflective surface 132 and second reflective surface 136 with the use of an input mechanism that communicates with a motor, such as the input mechanism and motor 140 described above.

Figure 3:
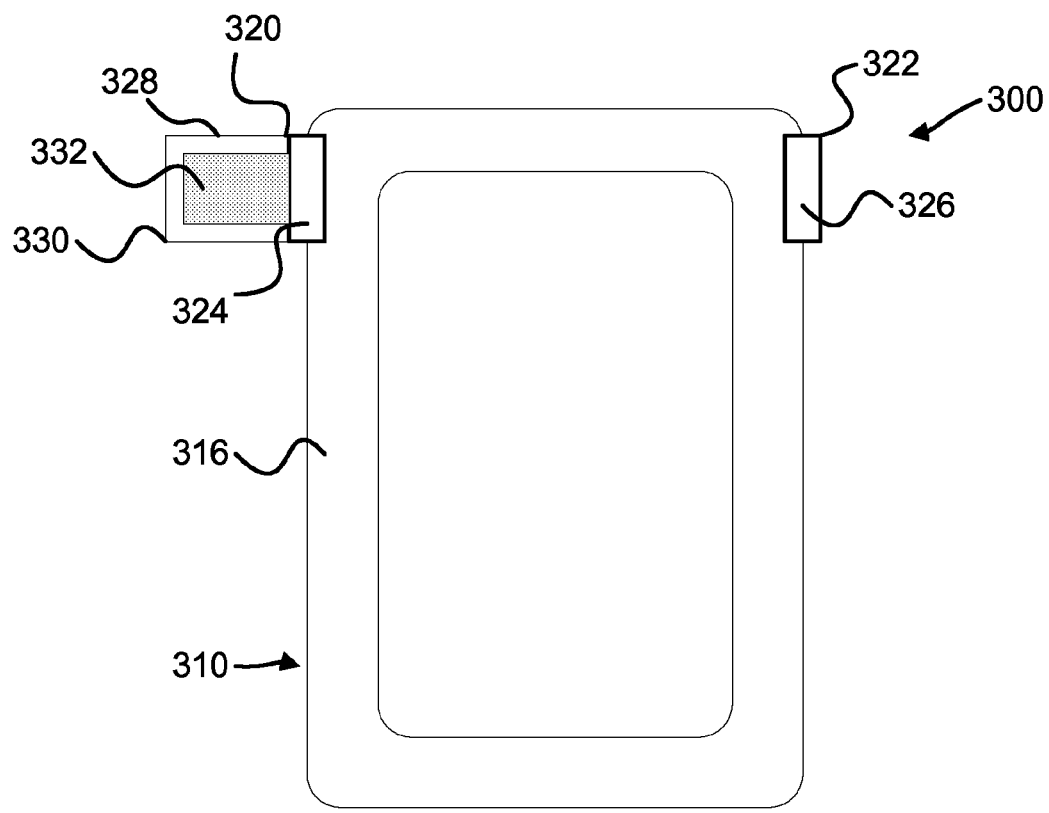
FIG. 3 is a front view of an example apparatus attached to an example mobile device.

FIG. 3 is a front view of an example apparatus 300 attached to an example mobile device 310. FIG. 3 shows a front surface 316 of the mobile device 310, which may be a mobile device such as the mobile device 110.

The apparatus 300 may be an apparatus such as the apparatus 100, and may also include an attachment mechanism 320, a light redirection portion 330, and a motor (not shown).

In some examples, the attachment mechanism 320 includes a solid band 322 with a first bent arm 324 and a second bent arm 326. Each of the bent arms 324, 326 wraps around a side of the mobile device 310 in a friction fit to hold the attachment mechanism 320 in place on the mobile device 310. The attachment mechanism 320 may further include an arced section 328 that is integral with the light redirection portion 330 and may enclose the back of the light redirection portion 330. Thus, the attachment mechanism 320 may serve to stabilize and maintain the light redirection portion 330 in a fixed position on the mobile device 310.

The light redirection portion 330 may include a first reflective surface 332, a non-reflective surface (not shown), and a second reflective surface (not shown). The second reflective surface may be positioned opposite from and at an angle to the camera lens.

In this example, at least a portion of the first reflective surface 332 extends off of a side of the mobile device 310 and will redirect light rays to the second reflective surface, and then to the camera lens, in a similar fashion as described with reference to FIGS. 1A-2.

The motor may be any electric motor known in the art, and may be connected to one or more of the reflective surfaces and/or the non-reflective surface as described with reference to FIGS. 1A-1B.

In some examples, an input mechanism may be positioned on the attachment mechanism 320 to allow for a user to control the motor, as described with reference to FIGS. 1A-1B.

In some embodiments, the light redirection portion 330 may further be used to redirect a flash of a camera to provide light in any direction.

In some embodiments, polarization filters may additionally be provided. The polarization filters may filter out the polarized component of light at the time of exposure, and may absorb some light waves. In one embodiment, the polarization filter may be a linear filter. In another embodiment, the polarization filter may be a circular filter.

The apparatus 300 may be placed on the mobile device 310 such that the arced section 328 extends from the left side or the right side. Thus, if a user wants to change the side that the arced extends from, the user can simply turn the apparatus 300 around before placing the apparatus 300 on the mobile device 310. In an alternative embodiment, the arced section 328 comprising the light redirection portion 330 may be rotatable on the apparatus 300, such that the arced section 328 can rotate to extend from the opposite side of the mobile device.

Figure 4:
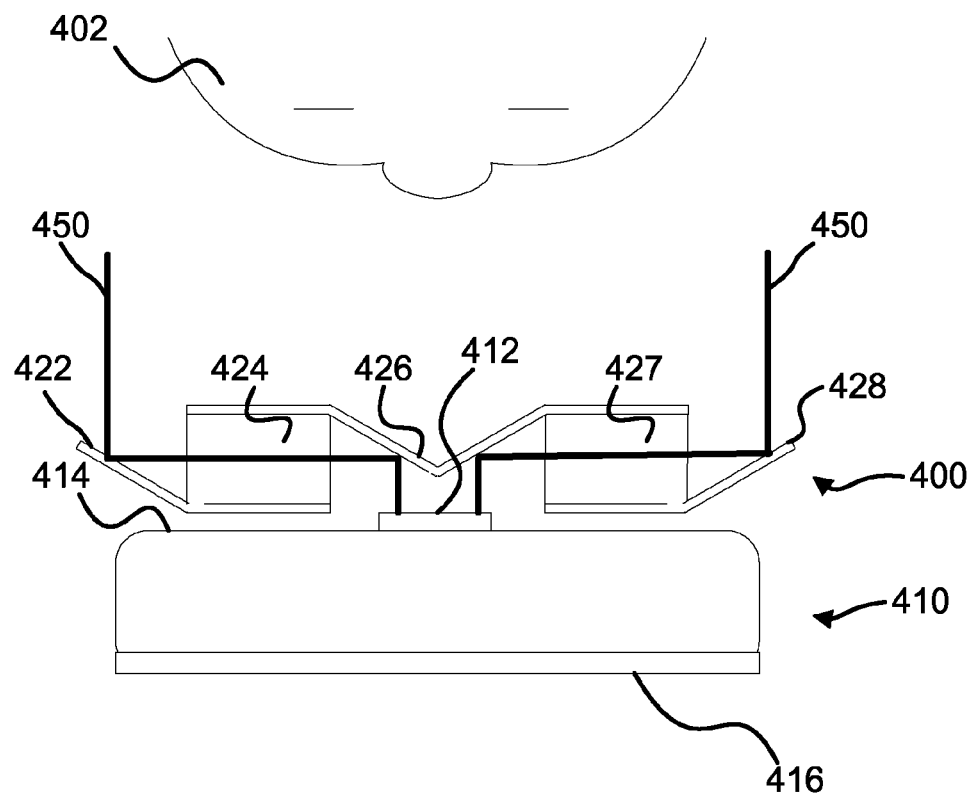
FIG. 4 is a top view of an example apparatus attached to an example mobile device.

FIG. 4 is a top view of an example apparatus 400 attached to an example mobile device 410, which may be a mobile device such as the mobile device 110. The mobile device 410 includes a camera with a mono camera lens 412 that extends from a back surface 414 of the mobile device 410. The mobile device 410 also includes a front surface 416. The apparatus 400 may include a number of attachment mechanisms to attach to the mobile device 410.

The apparatus 400 may include a first reflective surface 422, a first pathway 424, a splitter 426, a second pathway 427, and a second reflective surface 428.

The apparatus 400 is configured to convert a monocular camera to a stereoscopic camera. In some examples, the apparatus 400 may be used both to split still images as well as videos.

In operation, when the user 402 faces the back surface 414 of the mobile device 410 and tries to take a picture or video of him or herself, light rays, depicted by lines 450, enter from the left and the right and hit the first reflective surface 422 and the second reflective surface 428. Each of the light rays 450 then reflects or is redirected off of the first reflective surface 422 and the second reflective surface 428 and moves through the first pathway 424 and the second pathway 427, respectively. In the present example, the splitter 426 includes two tilted sides that form a V-shape. The light rays 450 coming from the first pathway 424 and the second pathway 427 will hit each side of the splitter. The splitter then reflects or redirects the light rays 450 such that the light rays 450 move to the camera lens 412. Thus, a captured single image may be split between a first and a second displaced reflective surfaces.

In some examples, lenses or filters may be located in front of each of the first reflective surface 422 and the second reflective surface 428, such that the light rays pass through the lens or filter before hitting either reflective surface.

Figure 5:
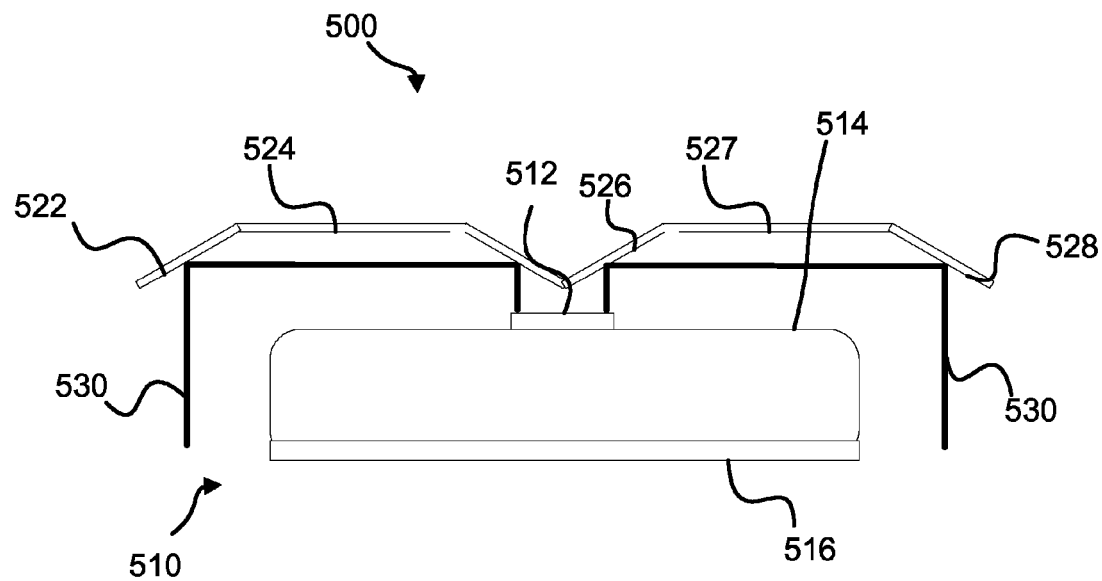
FIG. 5 is a top view of an example apparatus attached to an example mobile device.
Figure 5:
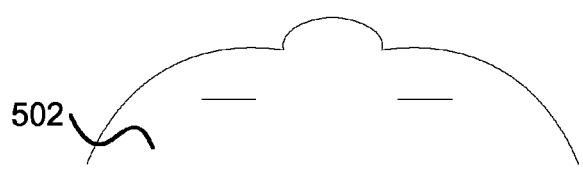

FIG. 5 is a top view of another example apparatus 500 attached to an example mobile device 510. The mobile device 510 may be a device such as the mobile device 110. The mobile device 510 includes a camera with a mono camera lens 512 that extends from a back surface 514 of the mobile device 510. The mobile device 510 also includes a front surface 516 that, in this example, faces a user 502. The apparatus 500 may include a number of attachment mechanisms to attach to the mobile device 510.

The apparatus 500 is configured to convert a rear-facing monocular camera to a front-facing stereoscopic camera. In some examples, the apparatus 500 may be used both to split still images as well as videos. The apparatus 500 may include a first reflective surface 522, a first non-reflective surface 524, a splitter 526, a second non-reflective surface 527, and a second reflective surface 528.

In operation, a user 502 tries to take a picture of him or herself while looking into the screen on the front surface 516 of the mobile device 510. Light rays, depicted by lines 530, enter from the left and the right and hit the first reflective surface 522 and the second reflective surface 528, respectively. The light rays 530 then reflect or are redirected off of the first reflective surface 522 and the second reflective surface 528, and move past the first and the second non-reflective surfaces 524, 527, respectively. In the present example, the splitter 526 includes two surfaces that are tilted to form a V-shape as shown in FIG. 5. The light rays 530 hit each side of the splitter 526 and are reflected or redirected such that the light rays 530 hit the camera lens 512. Thus, a captured single image may be split between left and right displaced reflective surfaces and may convert the rear-facing camera to a front-facing camera.

Figure 6:
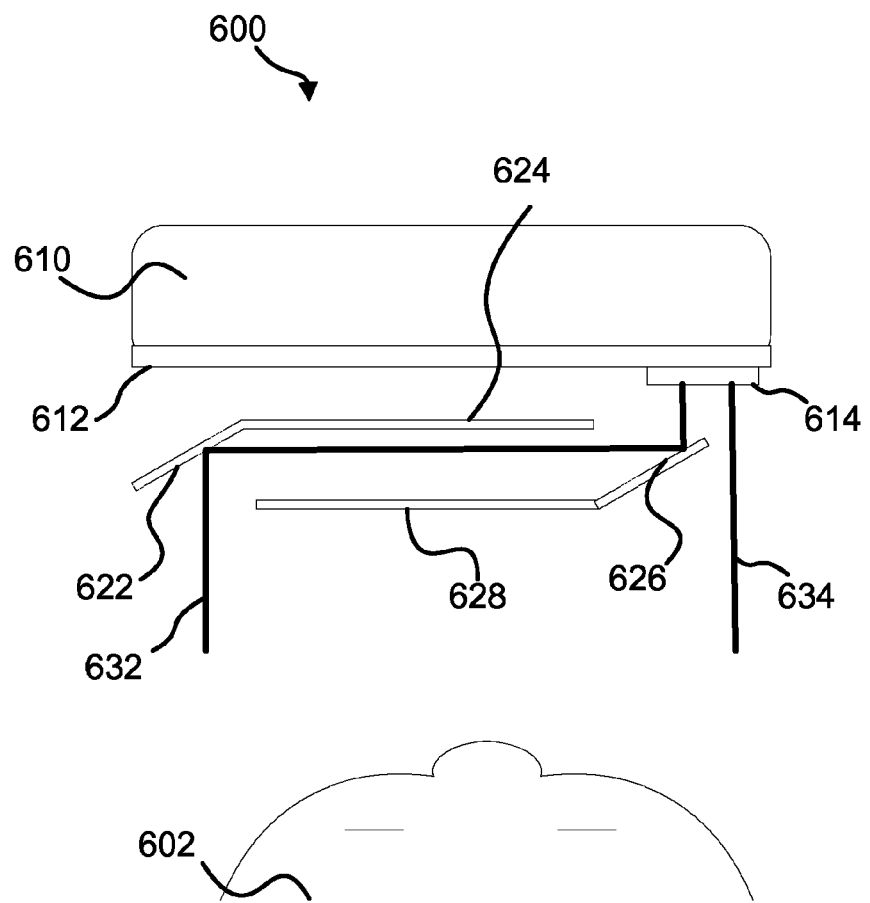
FIG. 6 is a top view of an example apparatus attached to an example mobile device.

FIG. 6 is a top view of another example apparatus 600 attached to an example mobile device 610. The mobile device 610 may be a device such as the mobile device 110; however, mobile device 610 includes, on a front surface 612 of the mobile device 610, a camera with a camera lens 614.

The apparatus 600 may include a first reflective surface 622, a first non-reflective surface 624, a second reflective surface 626, and a second non-reflective surface 628.

In operation, a user 602 wants to take a picture of him or herself while looking into the screen on the front surface 612 of the mobile device 610. In this example, a camera with a camera lens 614 is positioned on the front surface 612 of the mobile device 610. An exemplary first light ray 632 first hits the first reflective surface 622, and is then reflected or is redirected off of the first reflective surface 622 such that the first light ray 632 moves in between a channel created by the first and the second non-reflective surfaces 624, 628. The first light ray 632 may move substantially parallel to the surfaces 624, 628 for example. A second exemplary light ray 634 moves straight ahead from the user 602 and directly hits the camera lens 614. Thus, the apparatus 600 is configured to create a partial mirror combined image.

2. METHODS FOR CAPTURING IMAGES OR VIDEOS

As mentioned, attachments including mirrors may be provided on a device to perform a number of functions. Example functions are described below.

Figure 7:
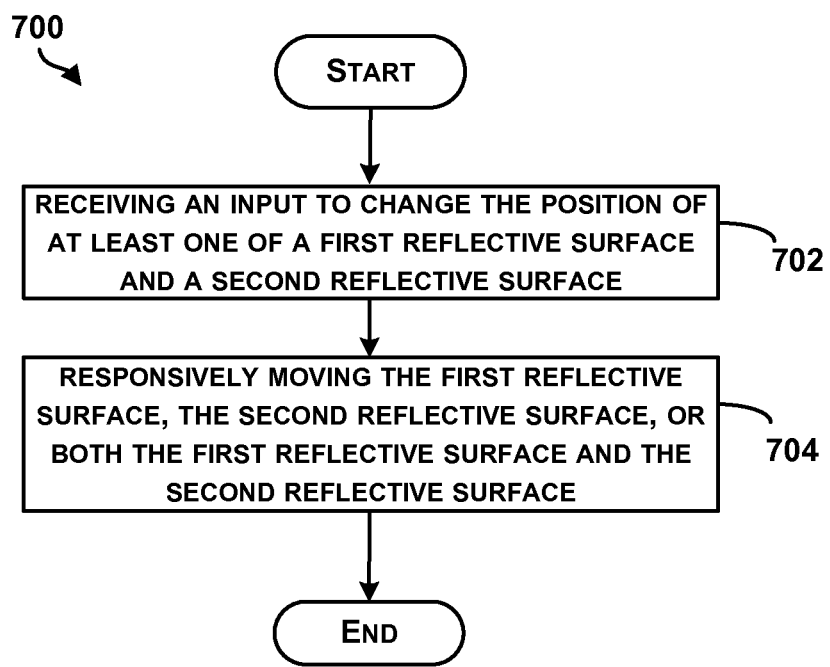
FIG. 7 is a block diagram of an example method for reorienting a camera, all arranged in accordance with at least some embodiments described herein.

FIG. 7 is a block diagram of an example method for reorienting a camera. Method 700 shown in FIG. 7 presents an embodiment of a method that, for example, could be used with the apparatuses 100 and 300, for example, illustrated in FIGS. 1A-3. Method 700 may include one or more operations, functions, or actions as illustrated by one or more of blocks 702-704. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of present embodiments.

The method 700 is performed by an apparatus removably coupled to a device having a camera lens. The apparatus has a first reflective surface configured to direct a ray of light in a first direction and a second reflective surface configured to direct the ray of light in a second direction. A non-reflective surface is coupled between the first and the second reflective surfaces.

The second direction may send the ray of light into a camera lens. As an example, the second reflective surface may be tilted to a desired angle such that when a ray of light hits the reflective surface, the ray is redirected toward a camera lens of a mobile device. The second reflective surface may be positioned such that it is opposite the camera lens and the reflective surface faces the camera lens.

The non-reflective surface minimizes distortions during the directing of the ray of light in the first direction by its position between the first and the second reflective surfaces. In one example, the first reflective surface may be attached to one side of the non-reflective surface, and the second reflective surface may be attached to the opposite side of the non-reflective surface. The ray of light may move substantially parallel to the non-reflective surface.

At block 702, the method 700 includes receiving an input to change the position of at least one of the first reflective surface and the second reflective surface. As an example, the first reflective surface may be tilted to a desired angle such that when a ray of light hits the reflective surface, the ray is redirected in a particular direction.

In one example, an input mechanism may be present on an apparatus that includes the first reflective surface, the non-reflective surface, and the second reflective surface. The input mechanism may communicate with a processor within the apparatus. The processor may include one or more instructions executable for implementing specific logical functions or steps in the process; such as moving one of the first reflective surface, the second reflective surface, or both. The program code may be stored on any type of computer readable medium, and may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In one example, the processor may instruct a motor within the apparatus to move one or more of the first and the second reflective surfaces.

In an alternative example, the input mechanism may be mechanically or electrically connected to a motor and may communicate directly with the motor to move the surfaces, without the use of a processor.

At block 704, the method 700 includes responsively moving the first reflective surface, the second reflective surface, or both the first reflective surface and the second reflective surface. As previously mentioned, a motor may move the first reflective surface, the second reflective surface, or both the first reflective surface and the second reflective surface.

3. CONCLUSION

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense. Further, it is intended to be understood that the following claims further describe aspects of the present description.

I claim:

1. An apparatus comprising:
   a first reflective surface;
   a second reflective surface;
   a non-reflective surface positioned between the first reflective surface and the second reflective surface, wherein the first reflective surface is positioned at a first angle relative to the non-reflective surface, and wherein the second reflective surface is positioned at a second angle relative to the non-reflective surface;
   an attachment mechanism coupled to the second reflective surface comprising a band with a first arm and a second arm configured to attach the apparatus to a device including a camera lens, wherein each of the first arm and the second arm is configured to wrap around sides of the device such that the second reflective surface is positioned opposite the camera lens;
   a motor connected to at least two of the first reflective surface, the second reflective surface, and the non-reflective surface; and
   an input mechanism in communication with the motor, wherein the input mechanism is configured to receive commands to control the motor to move at least one of the first reflective surface, the second reflective surface, and the non-reflective surface, wherein moving the first reflective surface changes the first angle relative to the non-reflective surface, and wherein moving the second reflective surface changes the second angle relative to the non-reflective surface.

2. The apparatus of claim 1, wherein each of the first arm and the second arm is configured to wrap around the sides of the device to attach the apparatus to the device in a friction fit.

3. The apparatus of claim 1, wherein the motor is connected to at least one of the first reflective surface, the second reflective surface, and the non-reflective surface via cables.

4. The apparatus of claim 1, wherein the motor is connected to at least one of the first reflective surface, the second reflective surface, and the non-reflective surface via gears.

5. The apparatus of claim 1, further comprising a polarization filter.

6. A method performed by an apparatus removably coupled to a device having a camera lens, the apparatus having a first reflective surface configured to direct a ray of light in a first direction, a second reflective surface positioned opposite the camera lens and configured to direct the ray of light in a second direction, a non-reflective surface coupled between the first and the second reflective surfaces, wherein the first reflective surface is positioned at a first angle relative to the non-reflective surface, and wherein the second reflective surface is positioned at a second angle relative to the non-reflective surface, an attachment mechanism coupled to the second reflective surface comprising a band with a first arm and a second arm configured to attach the apparatus to the device having the camera lens, wherein each of the first arm and the second arm is configured to wrap around sides of the device such that the second reflective surface is positioned opposite the camera lens, and a motor connected to at least two of the first reflective surface, the second reflective surface, and the non-reflective surface, the method comprising:
   receiving an input to change a position of at least one of the first reflective surface, the second reflective surface, and the non-reflective surface to direct the ray of light into the camera lens; and
   in response to the input, controlling the motor to move at least one of the first reflective surface, the second reflective surface, and the non-reflective surface, wherein moving the first reflective surface changes the first angle relative to the non-reflective surface, and wherein moving the second reflective surface changes the second angle relative to the non-reflective surface.

7. The method of claim 6, wherein changing the position of at least one of the first reflective surface, the second reflective surface, and the non-reflective surface comprises the motor moving a gear set.

8. The method of claim 6, wherein changing the position of at least one of the first reflective surface, the second reflective surface, and the non-reflective surface comprises the motor moving at least one cable that is attached to the first reflective surface.

9. The method of claim 6, wherein changing the position of at least one of the first reflective surface, the second reflective surface, and the non-reflective surface comprises the motor moving at least one cable that is attached to the second reflective surface.

10. The method of claim 6, further comprising filtering light with a polarization filter.

11. The method of claim 6, further comprising:
    sending, via a processor, a signal to the motor to change the tilt of at least one of the first reflective surface and the second reflective surface.

12. An apparatus comprising:
    a first reflective surface;
    a second reflective surface;
    a splitter;
    a first non-reflective surface positioned between the first reflective surface and the splitter, wherein the first reflective surface is positioned at a first angle relative to the first non-reflective surface;
    a second non-reflective surface positioned between the second reflective surface and the splitter, wherein the second reflective surface is positioned at a second angle relative to the second non-reflective surface;
    an attachment mechanism coupled to the second reflective surface comprising a band with a first arm and a second arm configured to attach the apparatus to a device including a camera lens, wherein each of the first arm and the second arm is configured to wrap around sides of the device such that the splitter is positioned opposite the camera lens;
    a motor connected to at least two of the first reflective surface, the second reflective surface, the first non-reflective surface, the second non-reflective surface, and the splitter; and
    an input mechanism in communication with the motor, wherein the input mechanism is configured to receive commands to control the motor to move at least one of the first reflective surface, the second reflective surface, the first non-reflective surface, the second non-reflective surface, and the splitter, wherein moving the first reflective surface changes the first angle relative to the first non-reflective surface, and wherein moving the second reflective surface changes the second angle relative to the second non-reflective surface.

13. The apparatus of claim 12, wherein the splitter is configured to receive a first ray of light from the first reflective surface and a second ray of light from the second reflective surface, and the splitter responsively directs the first ray of light and the second ray of light in a different direction from the direction in which the rays were received.

14. The apparatus of claim 13, wherein the splitter is configured to send the first ray of light and the second ray of light in the same direction.

15. An apparatus configured to removably coupled to a device having a camera lens, the apparatus comprising:
- a first reflective surface configured to direct a first ray of light in a direction;
- a second reflective surface configured to direct the first ray of light into the camera lens, wherein the second reflective surface is positioned such that a second ray of light hits the camera lens without contacting the apparatus;
- a first non-reflective surface coupled to the first reflective surface, wherein the first reflective surface is positioned at a first angle relative to the first non-reflective surface;
- a second non-reflective surface coupled to the second reflective surface, wherein the second reflective surface is positioned at a second angle relative to the second non-reflective surface;
- an attachment mechanism coupled to at least one of the first reflective surface and the second reflective surface, the attachment mechanism comprising a band with a first arm and a second arm configured to removeably attach the apparatus to the device, wherein each of the first arm and the second arm is configured to wrap around sides of the device;
- a motor connected to at least two of the first reflective surface, the second reflective surface, the first non-reflective surface and the second non-reflective surface; and
- an input mechanism in communication with the motor, wherein the input mechanism is configured to receive commands to control the motor to move at least one of the first reflective surface, the second reflective surface, the first non-reflective surface and the second non-reflective surface, wherein moving the first reflective surface changes the first angle relative to the first non-reflective surface, and wherein moving the second reflective surface changes the second angle relative to the second non-reflective surface.

\* \* \* \* \*